US009172673B2

(12) United States Patent
Shorter et al.

(10) Patent No.: US 9,172,673 B2
(45) Date of Patent: Oct. 27, 2015

(54) SYSTEMS AND METHODS FOR DOMAIN NAME EXCHANGE

(75) Inventors: William Shorter, Arlington, VA (US); James Gould, Leesburg, VA (US); Joseph Waldron, Herndon, VA (US); Patrick Kane, Ashburn, VA (US); Suzanna Strier, Ashburn, VA (US); Srikanth Veeramachaneni, South Riding, VA (US)

(73) Assignee: VERISIGN, INC, Reston, VA (US)

( * ) Notice: Subject to any disclaimer, the term of this patent is extended or adjusted under 35 U.S.C. 154(b) by 220 days.

(21) Appl. No.: 12/982,099

(22) Filed: Dec. 30, 2010

(65) Prior Publication Data

US 2012/0173685 A1    Jul. 5, 2012

(51) Int. Cl.
*G06F 15/17* (2006.01)
*H04L 29/12* (2006.01)
*H04L 12/24* (2006.01)
*G06F 15/16* (2006.01)

(52) U.S. Cl.
CPC ...... *H04L 61/1511* (2013.01); *H04L 29/12066* (2013.01); *G06F 15/16* (2013.01); *H04L 41/00* (2013.01)

(58) Field of Classification Search
CPC ... H04L 12/24; H04L 29/01; H04L 29/12132; H04L 41/00; G06F 11/00; G06F 15/16
USPC ................................................. 709/223–226
See application file for complete search history.

(56) References Cited

U.S. PATENT DOCUMENTS

| | | | |
|---|---|---|---|
| 6,880,007 B1 * | 4/2005 | Gardos et al. ................. 709/225 |
| 6,895,430 B1 | 5/2005 | Schneider |
| 6,901,436 B1 | 5/2005 | Schneider |
| 6,973,505 B1 | 12/2005 | Schneider |
| 7,069,323 B2 | 6/2006 | Gardos et al. |
| 7,076,541 B1 | 7/2006 | Burstein et al. |
| 7,188,138 B1 | 3/2007 | Schneider |
| 7,194,552 B1 | 3/2007 | Schneider |
| 7,356,534 B2 * | 4/2008 | Mohammed et al. ................. 1/1 |
| 7,565,402 B2 | 7/2009 | Schneider |

(Continued)

FOREIGN PATENT DOCUMENTS

WO    WO 2004/015547    2/2004
WO    WO 2005/093999    10/2005

OTHER PUBLICATIONS

The End of Domain Testing: Status Report on AGP Measures, ICANN, Aug. 12, 2009 http://www.icann.org/en/resources/registries/agp/agp-status-report-12aug09-en.htm.*

(Continued)

*Primary Examiner* — Joshua Joo
*Assistant Examiner* — Younes Naji
(74) *Attorney, Agent, or Firm* — MH2 Technology Law Group, LLP

(57) ABSTRACT

A system, method, and computer-readable medium, is described that enables a domain name registrant the ability to exchange their existing domain in favor of a new domain without incurring additional domain registration fees and without affecting the other data fields of the existing domain. Once the domain exchange service is added to the domain registration, the registrant can exchange the domain name as often as it likes in accordance with the business rules of the registry until the domain exchange service expires.

21 Claims, 12 Drawing Sheets

(56) References Cited

U.S. PATENT DOCUMENTS

| | | | |
|---|---|---|---|
| 8,037,168 | B2 | 10/2011 | Schneider |
| 8,224,994 | B1 | 7/2012 | Schneider |
| RE43,690 | E | 9/2012 | Schneider et al. |
| RE44,207 | E | 5/2013 | Schneider |
| 8,458,161 | B2 | 6/2013 | Schneider |
| 8,612,565 | B2 | 12/2013 | Schneider |
| 8,635,340 | B1 | 1/2014 | Schneider |
| 2007/0299967 | A1* | 12/2007 | Brady .......................... 709/224 |
| 2008/0016233 | A1 | 1/2008 | Schneider |
| 2008/0052196 | A1* | 2/2008 | Fino et al. ...................... 705/27 |
| 2008/0059607 | A1 | 3/2008 | Schneider |
| 2012/0117621 | A1* | 5/2012 | Kondamuru et al. ............. 726/3 |
| 2013/0091100 | A1* | 4/2013 | Christenson et al. ......... 707/689 |

OTHER PUBLICATIONS

Product and website by JH Software, Simple DNS Plus by JH Software, http://www.simpledns.com/default.aspx, downloaded Nov. 30, 2010 (1 page).

Product and website by JH Software, Simple DNS Plus—Features, http://www.simpledns.com/features.aspx, downloaded Nov. 30, 2010 (6 pages).

Siteground.com Inc., http://www.siteground.com/tutorials/getting_started/customers_manage_domain.htm, downloaded Nov. 30, 2010 (3 pages).

International Search Report and Written Opinion mailed Mar. 14, 2012, in Application PCT/US2011/065316 (8 pages).

* cited by examiner

Example Status Codes 810

| | |
|---|---|
| serverUpdateProhibited | 811 |
| serverDeleteProhibited | 812 |
| serverTransferProhibited | 813 |
| serverRenewProhibited | 814 |
| serverHold | 815 |
| Account Suspended | 816 |

Example Status Set Definitions 820

Court Order Hold 825
- serverUpdateProhibited
- serverDeleteProhibited
- serverTransferProhibited
- serverHold

Registry Lock 830
- serverUpdateProhibited
- serverDeleteProhibited
- serverTransferProhibited

Transfer Dispute Lock 835
- serverUpdateProhibited
- serverDeleteProhibited
- serverTransferProhibited

Server Renew Prohibited 840
- serverRenewProhibited

SYSTEMS AND METHODS FOR DOMAIN NAME EXCHANGE

TECHNICAL FIELD

This disclosure relates to improvements in the reserving of domain names.

BACKGROUND

The domain name system (DNS) and domain name registration system have become an integral part of how consumers and businesses conduct activity on the Internet.

One advantage of DNS is that it allows a person to visit a website by typing into a browser a "domain name", that is, a familiar word or group of words, rather than the numeric IP address of the computer on which the website resides. For example, a person desiring to visit the VeriSign website could do so by entering in their web browser the domain name "verisign.com" instead of an IP address, such as "10.10.1.100." Although, the user could enter either the domain name or the IP address, the moniker "verisign.com" is easier to remember than a string of digits. A domain name is an example of a "provisioned object," that is, an object that is assigned or released through an interface.

The DNS system also allows multiple websites to share one IP address when multiple domain names all resolve to (that is, are associated with) the same IP address. A webserver that has been assigned a specific IP address receives, as part of the request for web content, the domain name requested and can then deliver the desired content to the requesting computer. This multiple-website feature is important because there are a finite number of IP addresses of the form 10.10.1.100, so called "IPv4 addresses." Without this ability for multiple websites to share an IP address, the possible IPv4 address space would likely have already been exhausted.

Furthermore, the next version of IP address space, so called "IPv6," includes an even more complicated numeric format. Whereas IPv4 is only 32 bits in binary length, IPv6 is 128 bits. A typical hexadecimal representation of an IPv6 address is 2001:0db8:85a3:0000:0000:8a2e:0370:7334. Because of the increased length of IP address in this format, there are approximately $5 \times 10^{28}$ theoretical addresses available for each one of the 6.8 billion people alive. Although IP address exhaustion will no longer be a concern under the new addressing scheme, the DNS system remains important so that people can use familiar domain names rather than long strings of hexadecimal digits to visit websites or access machines on the Internet.

Domain name registration is the process by which a registrant can reserve or lease the use of a domain name for a specified period of time from the date of registration. The domain name registration system consists of various top level domains (TLDs), such as the traditional .com, .net, .org, .edu, and .gov, as well as the newer .biz, .info, and .name. The domain name registration system has also evolved to incorporate various country code TLDs (ccTLDs), each one reserved for use by a particular country, such as, .ca, .cn, .tv, and .us, associated with Canada, China, Tuvalu, and the United States, respectively. The domain name system and domain name registration system have also evolved to allow the use of alternative character sets to accommodate foreign languages.

A domain name is reserved by a domain name "registrant." The registrant may reserve the domain name for at least one year but may reserve the domain name for up to ten years. Domain names are reserved through domain "registrars." Registrars are entities having business relationships with domain "registries" that control the domain names for a particular TLD. Thus, the registrar provides the interface to the registrant to reserve the domain name from a registry. The registry manages the reserved names and available names for a particular TLD and makes available the information to the registrar through the Extensible Provisioning Protocol (EPP). Registrars that are authorized by the registry have the ability to make reservations and check the state of domain names through the EPP. The registry provides the EPP as a communications gateway to registrars for such purposes.

In a typical domain name registration example, a registrant may want to reserve the domain name "example.com." The registrant would contact a registrar that has a business relationship with the registry that operates the .com TLD. The registrant would query the registrar as to the availability of the domain name "example" in the .com namespace. The registrar in turn would query the proper registry through the EPP, then return the results to the registrant. The registrant may then obtain a registration of the domain name by paying a registration fee and providing information required by the registry and registrar. The registry charges the registrar for the domain name registration and the registrar collects the registration fee from the registrant.

To maintain a domain name in accordance with current regulations, the registry responsible for a TLD is required to keep a certain minimum amount of information with the domain name to ensure proper identification, security features, and operability associated with the domain name. For example, all domain registrants are required to make available to the registry, current administrative contact information. Also, in order for a domain name to work correctly, the registry must have nameserver information for the domain to load into its TLD DNS system to refer outside DNS requests to the proper authoritative DNS servers. Also, to prevent accidental changes to the domain name settings, certain status codes are available to put various levels of protection on the domain name. This information will be discussed below in more detail.

One problem with having the registry system as described is that it does not easily accommodate some registrants with alternative business models for domain registration. Thus, some potential registrants may limit their purchase of domain name registrations. For example, suppose a web hosting service provider would like to provide an option for a web hosting contract with its customer that includes the use of a domain name without charge to the customer. In reality, the web hosting service provider is hoping to recover the cost of the fees it pays for domain registration through web hosting fees it will charge to the customer over a period of time. Under the traditional domain registration schemes described above, if the customer prematurely ceases paying its web hosting fees, then the web hosting service provider may fail to recover the fees it paid to the registrar for registration of the domain name. Therefore a method is needed to allow the web hosting provider to exchange the domain name registered for the early-termination customer in favor of a different domain name that it can offer to its next customer.

Another example where such a method would be desirable is when a domain registrant's interest is not in selling products or services per se under a brand associated with the domain name, but rather reserving domain names that Internet users might enter accidently, by exploiting typographical errors entered in web site addresses. For example, suppose a registrant wanted to commandeer web traffic intended to go to "example.com," but was not sure which variant of "example" would be most effective. The registrant might register, "example," "exampple," and "exampel" to see which was most effective, and place targeted advertising on the most effective variant. Under the traditional domain registration schemes described above, the registrant would lose the value of the domain names that did not produce many visits. In anticipation of this loss leader, the registrant may try small batches of reservations. If the registrant could exchange the unfruitful domain names for others, however, then the registrant might reserve many more initially, knowing that an unfruitful domain name could be exchanged for a domain name consistent with the registrant's next project. Therefore, a method of exchanging an existing domain name in favor of a new domain name is needed to encourage more registrations from this type of registrant.

SUMMARY

A computer-implemented method of processing a domain name includes receiving a new domain name and exchanging an existing domain name for a new domain name. The method includes updating a domain name server with the new domain name and processing the existing domain name to make the existing domain name available for registration by a new registrant.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 8 is an illustration of the available server Status Codes and exemplary Status Set definitions;

DETAILED DESCRIPTION

Reference will now be made in detail to the exemplary embodiments. Wherever possible, the same reference numbers will be used throughout the drawings to refer to the same or like parts.

Figure 1:
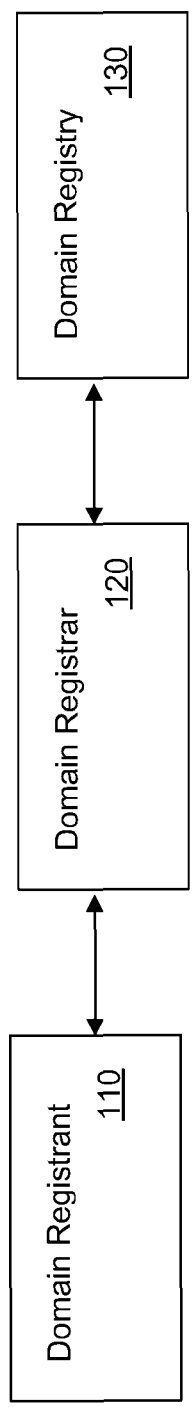
FIG. 1 is an illustration of the interaction between the Domain Registrant, Domain Registrar, and Domain Registry.

FIG. 1 illustrates the data flow and relationship definition of the three primary parties involved in a domain registration. The registrant 110 is typically an end user of the domain, but in some cases, may resell the domain to either another registrant in a domain transfer transaction or may retain ownership of the domain but let a third party use it, as when the registrant is a web hosting provider and the third party is a customer of the registrant. Moreover, some registrants never intend to use a domain in a traditional fashion. Some registrants hope to reserve desirable domain names that they can sell for a profit and some registrants reserve names that are slight variations of popular websites, hoping to receive Internet traffic from people mistyping the URL of the popular website. Registrants constantly find new ways to use the domain name system other than for the traditional use of hosting websites associated with the domain name that directs a user to a website.

Registrants 110 reserve domain names from registrars 120. Thus, the registrant's 110 relationship is primarily with the registrar 120. The registrar, however, maintains a relationship with one or more registries 130 that control the TLD for which registration is desired. Typically, large registrars have multiple relationships with many registries to assure they can provide registrants with many TLD domain options when reserving their domains.

Registries 130 control the assignment of domain names. A registry is responsible for assuring that domain information is accurate and up to date. Further, the registry is responsible for providing first level DNS support for the TLD. For example, the registry that manages the .org TLD must provide (or otherwise make available) a DNS server containing nameserver information for a domain name registered through the registry so that when a website is requested via the domain name in a URL, the proper nameserver will eventually respond to the request, by providing a fully resolved domain name (that is, resolved to the IP address of the machine designated as responsible to respond for the domain name). Registrar 120 and registry 130 each comprise one or more computers to implement the functions described herein, and may correspond to functions and structures disclosed below.

Figure 2:
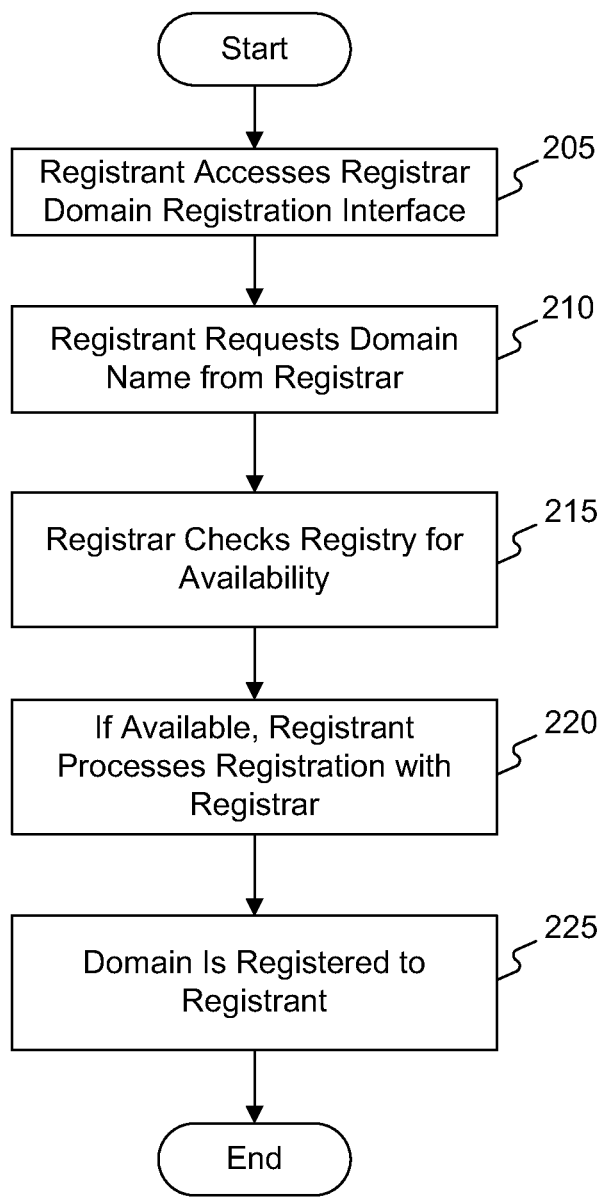
FIG. 2 is an illustration of a typical domain registration process.

A typical domain registration process is illustrated in FIG. 2. The process begins when the potential registrant accesses a registrar's domain registration interface 205. The registrant searches for a domain name to reserve 210. The registrar 120, in turn, must query the registry 130 for current registration and availability information on the requested domain 215. The results are returned to the potential registrant 110. If the domain name is available, the potential registrant can proceed with registration from the registrar 220. Finally, if the registrant 110 continues with registration, the domain will be reserved to the registrant for a minimum period of one year from the date of registration and up to a maximum period of ten years.

Figure 3:
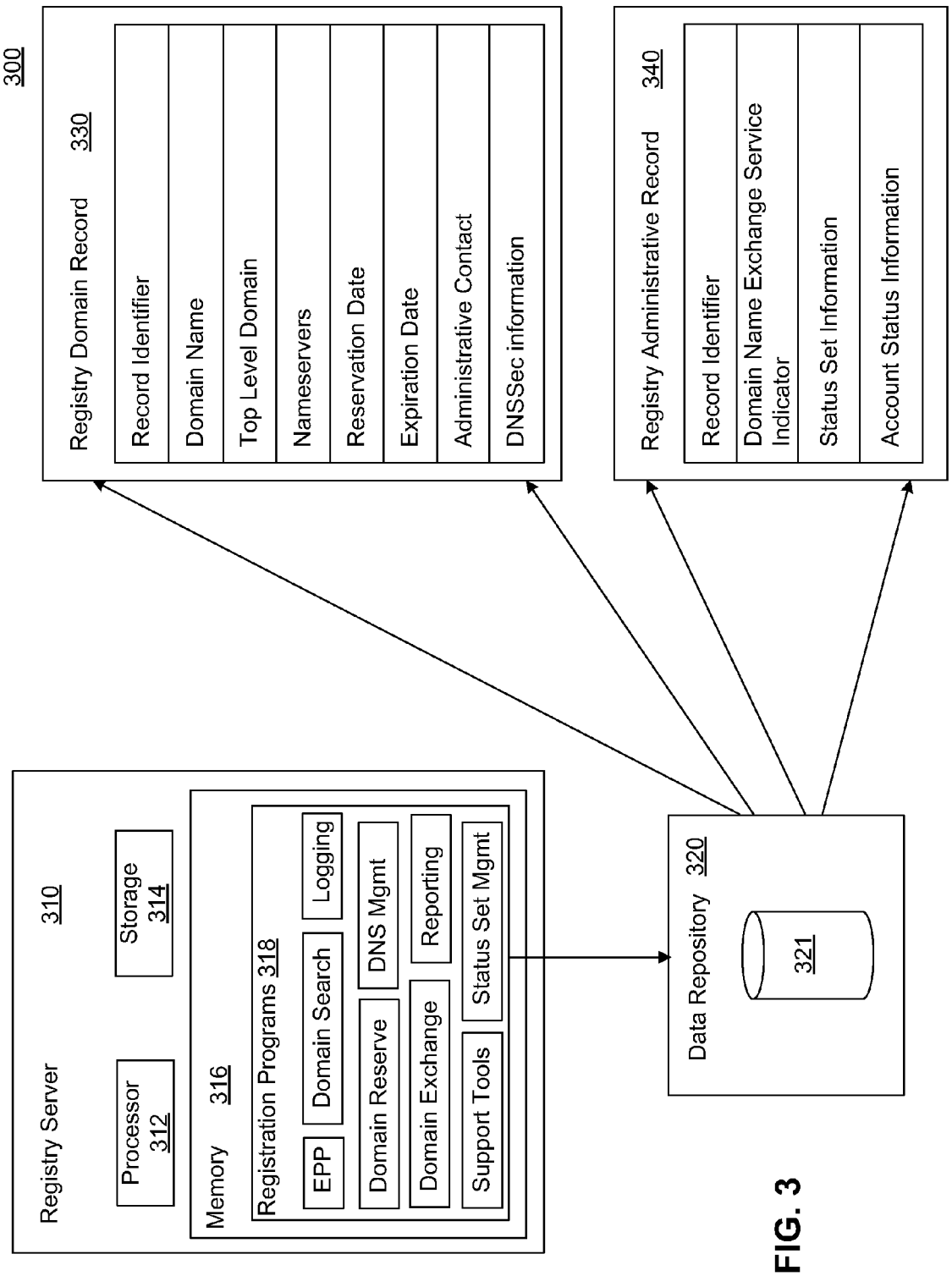
FIG. 3 is an illustration of a Domain Registry Server with supporting Registration Programs, including an exemplary registry domain record.
Figure 4:
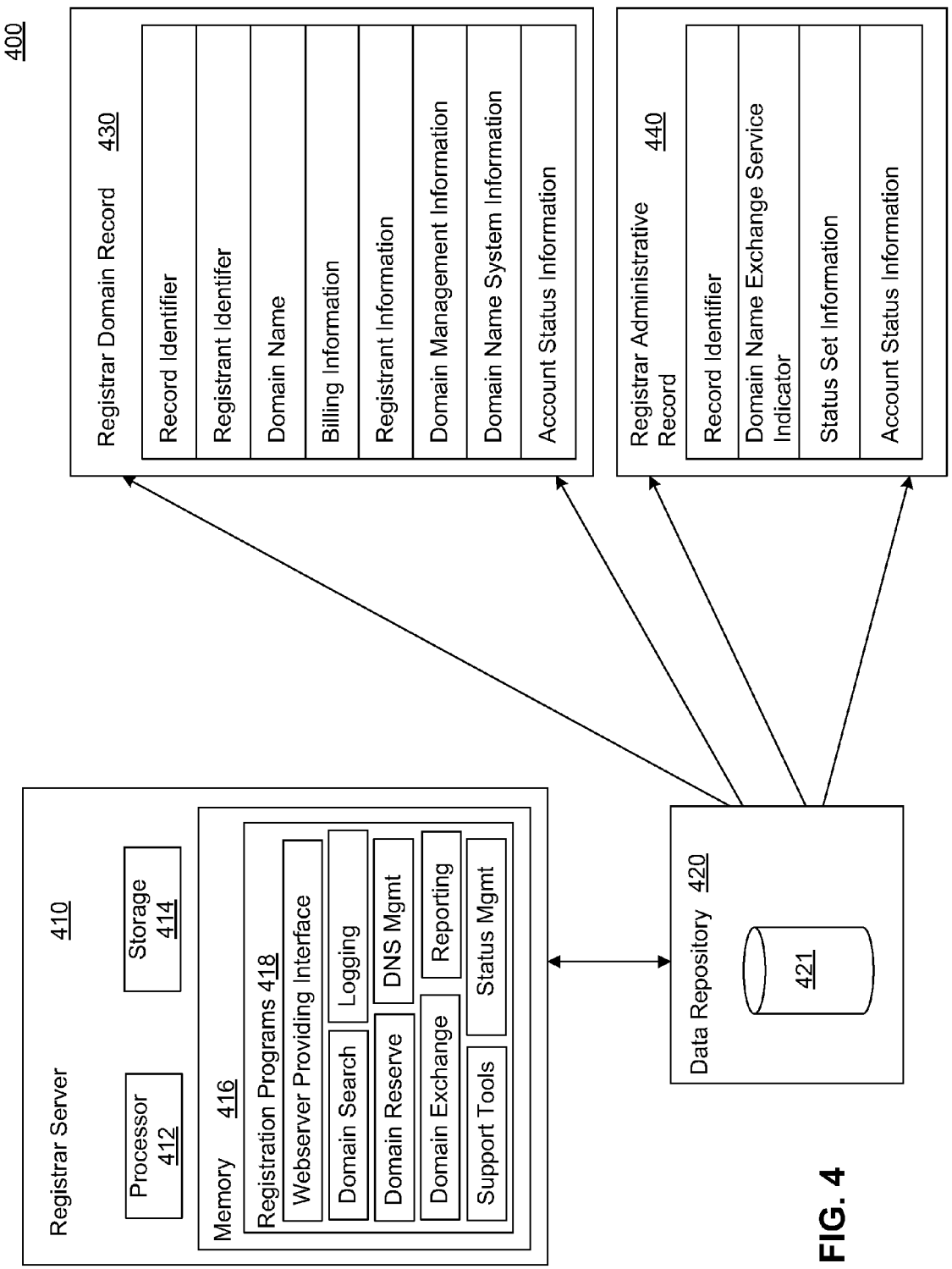
FIG. 4 is an illustration of a Domain Registrar Server with supporting Registration Programs, including an exemplary registrar domain record.

FIG. 3 and FIG. 4 contrast the typical kind of data stored by each of the registry 130 and registrar 120. FIG. 3 illustrates exemplary components 300 of the domain registry 130. The components 300 can include a domain registry server 310 having at least one processor 312, storage 314, and memory 316 that can store supporting registration programs 318 of the domain registry server 310. The domain registry server 310 can be communicatively coupled to a data repository 320, which can include a database 321 that stores at least one registry domain record 330 and registry administrative record 340. FIG. 4 illustrates exemplary components 400 of the domain registrar 120. The components 400 can include a domain registrar server 410 having at least one processor 412, storage 414, and memory 416 that can store supporting registration programs 418 of the domain registrar server 410. The domain registrar server 410 can be communicatively coupled to a data repository 420, which can include a database 421 that stores at least one registrar domain record 430 and registrar administrative record 440. As can be seen in FIGS. 3 and 4, the supporting registration programs 318 and 418 that run in each of the registry 130 and registrar 120 must perform similar functions, but with different scopes and purposes. For example, whereas the registry 130 implements the Extensible Provisioning Protocol (EPP) so that registrars can make queries of the domain reservation system, the registrar 120 implements a web server to present products and application interfaces to registrants. However, because the two serve fundamentally different purposes, the registry 130 does not need some information used by the registrar and the registrar 120 does not need some information used by the registry. For example, whereas the registry 130 may not require any contact information for the registrant 110 of the domain name, the registrar 120 needs to maintain contact and billing information for the registrant 110. And for example, whereas the registrar 120 may not require information regarding the server status codes applied by the registry, the registry 130 maintains this information to determine what operations are allowed for a domain name by the registrar.

Domain Name Exchange

In one embodiment, a service is provided that allows a registrant to exchange a current domain name for a new domain name. In contrast to the typical domain registration process of FIG. 2, the domain name exchange service allows the registrant to change domain names without incurring any additional registration fees. In one embodiment, upon activation of the domain name exchange service, the registrant has until the next anniversary date of the domain name registration to make as many domain name exchanges as possible in accordance with domain name exchange business rules.

In one embodiment, the business rules may specify that a domain name may only be exchanged at least 30 days after a previous domain name exchange and at least 30 days after the initial domain name registration. In another embodiment, the business rules may allow any number of days between exchanges and any number of days before a first exchange can be made. The business rules may be changed as the needs and goals of the business determine. In another embodiment, the business rules may allow a registrant to purchase a domain name exchange per exchange request for a fee in a transaction that somewhat resembles a domain registration, but that is less than a new domain name registration and retains the data in the existing domain name record, such as the expiration date and nameserver information.

Figure 5:
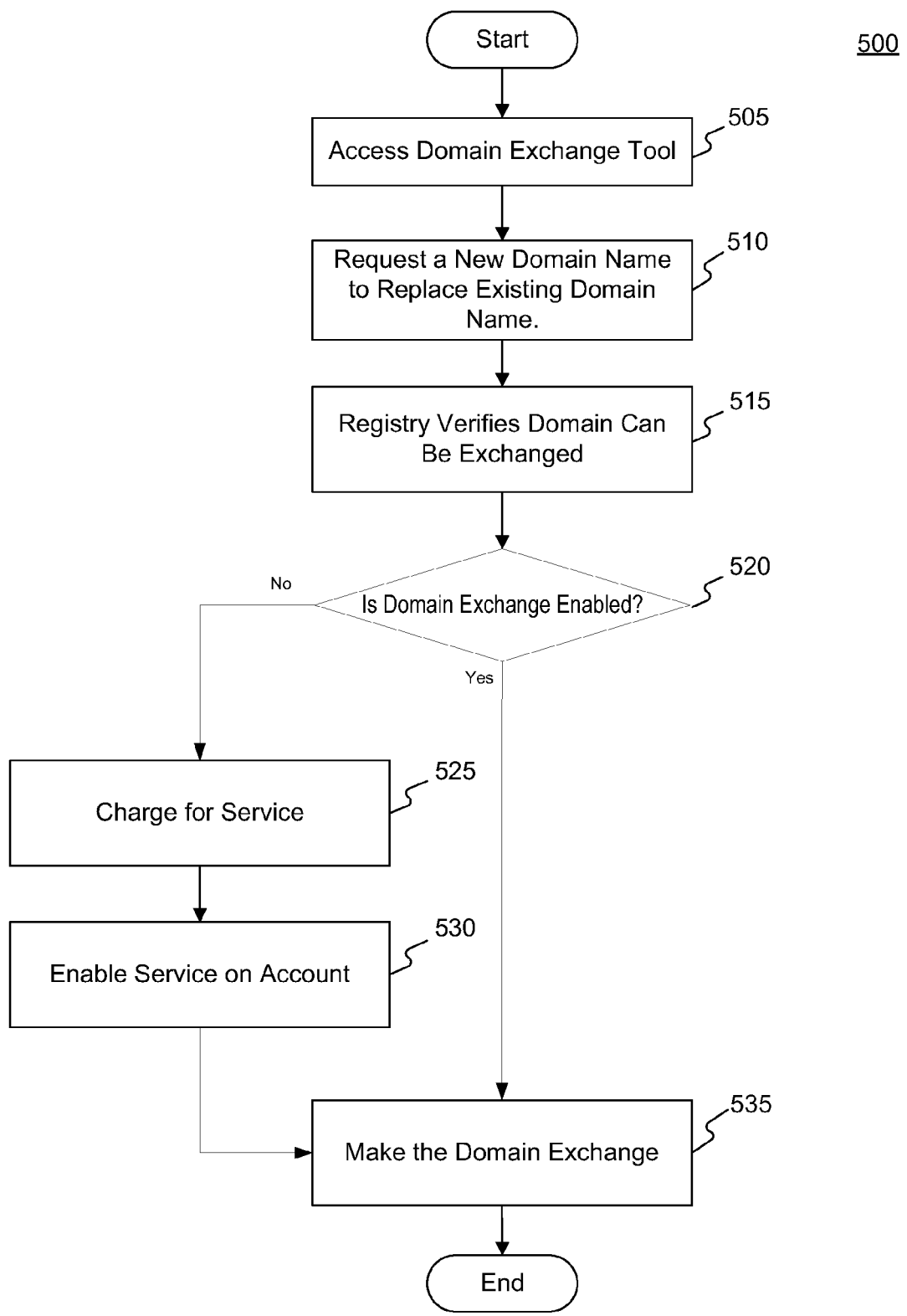
FIG. 5 is an illustration of the Domain Exchange process.
Figure 6:
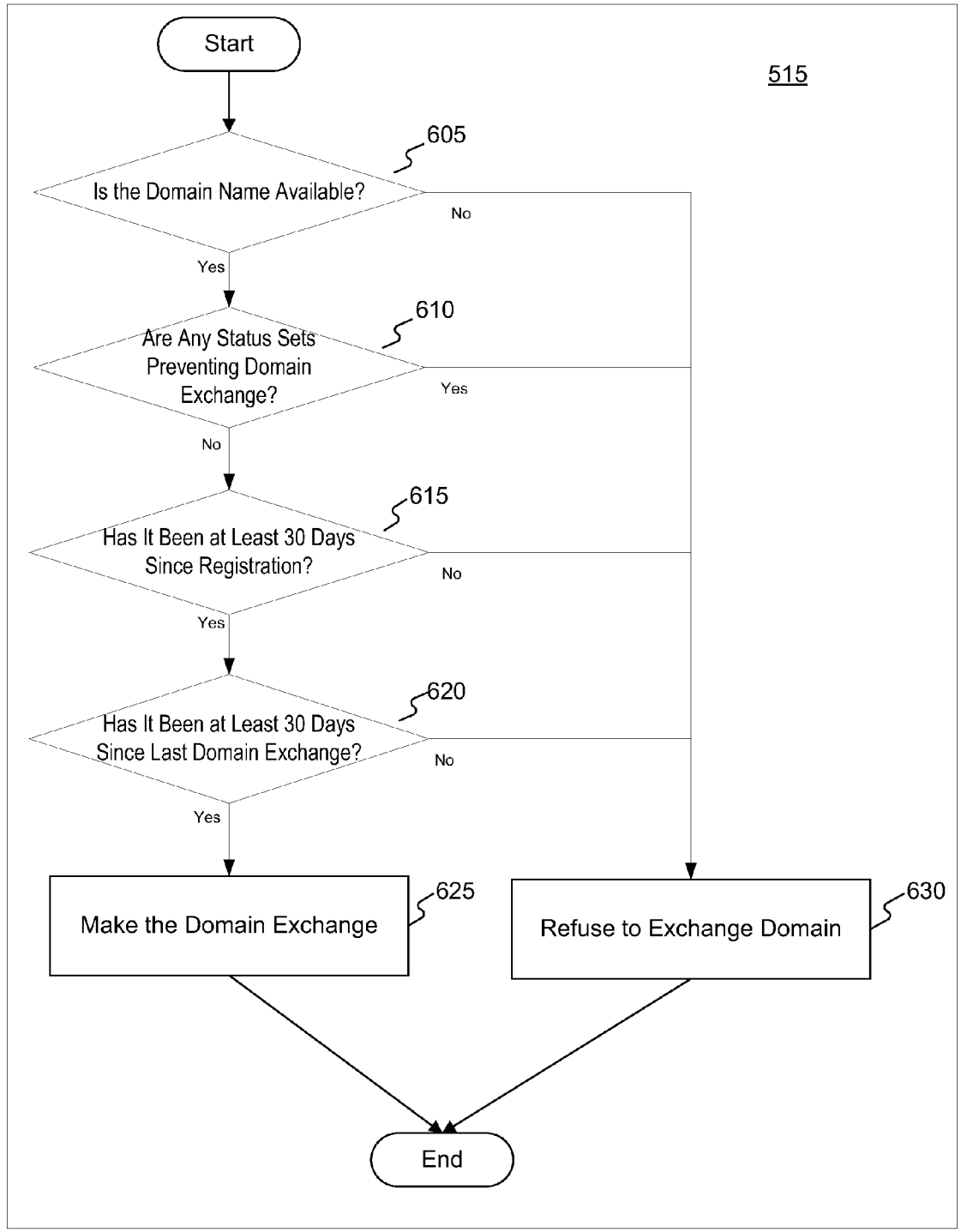
FIG. 6 is an illustration of one step of the Domain Exchange process as found in FIG. 5.
Figure 7:
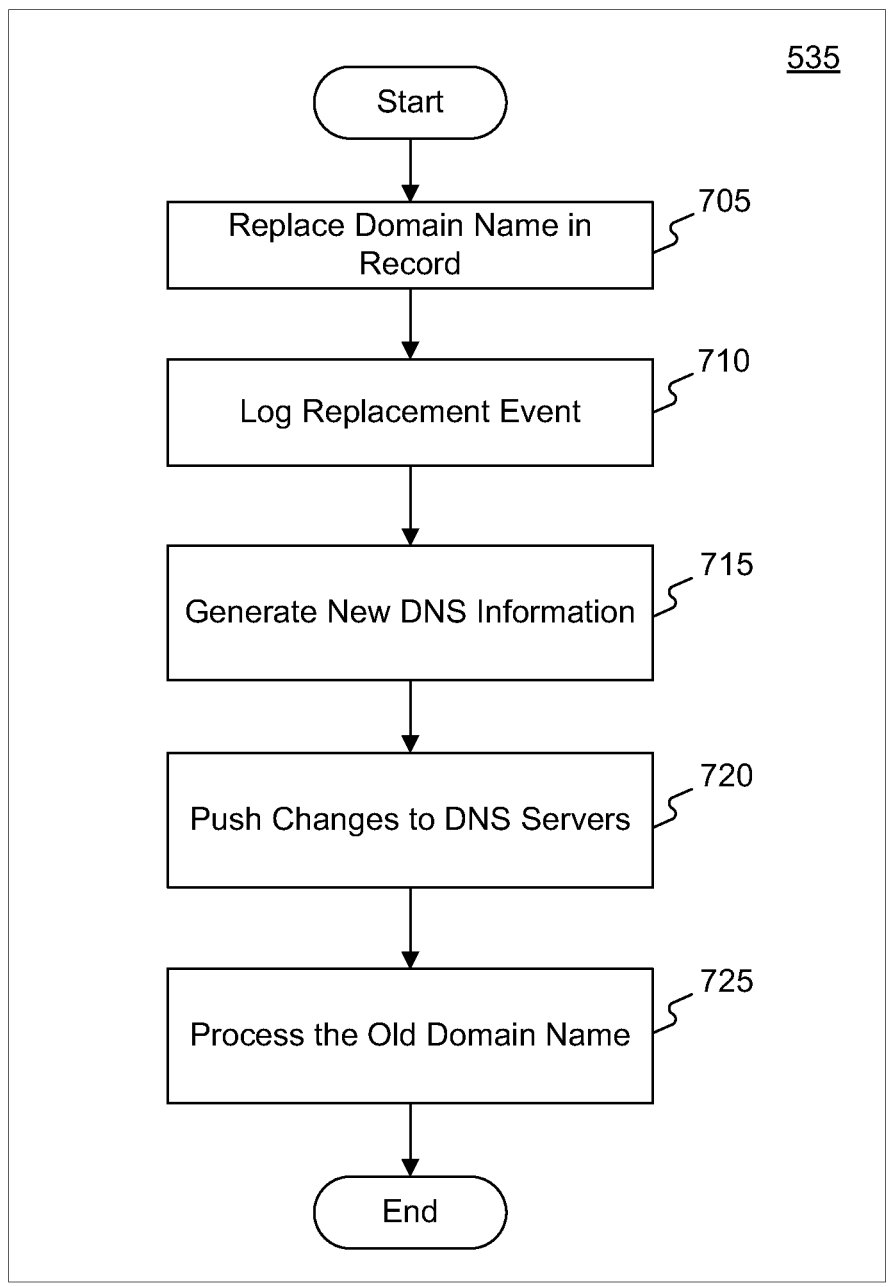
FIG. 7 is an illustration of another step of the Domain Exchange process as found in FIG. 5.

FIGS. 5 through 7 illustrate the domain name exchange process 500 of one embodiment. The registrant accesses a domain name exchange service (step 505) provided through their registrar. The registrant selects a new domain name using registrar-provided domain search tools, and requests that the new domain name replace the existing domain name (step 510). The registry will verify that the existing domain name is eligible for domain name exchange (step 515). If the domain name exchange service 520 is already enabled for the domain name record 330, then the domain name exchange (step 535) takes place, otherwise, a fee for the service is charged (step 525) to the registrar and the domain name exchange service is enabled for that domain record identifier 530, 330, and then the domain name exchange takes place (step 535).

FIG. 6 illustrates step 515 from FIG. 5 in greater detail. In particular, FIG. 6 illustrates the steps of a process to determine whether an existing domain name will be allowed to be exchanged for a new domain name. The particular number of days reflected in the following steps may be adjusted or omitted according to the business rules of the entity implementing such a system.

The registry verifies that the new domain name is available for registration (step 605), and that any domain name status codes that would prevent changes to the domain name are not active (step 610). In one embodiment, the business rules specify that registrants are allowed to exchange a domain name only after 30 days and then only every 30 days after that, as in steps 615 and 620. If the registry determines that the existing domain name is allowed to be exchanged for the new domain name based on the business rules (e.g., steps 605-620), then the registry can make the domain name exchange in step 625. Alternatively, if the registry determines that the existing domain name is not allowed to be exchanged for the new domain name based on the business rules, then the registry can refuse the domain name exchange 630.

FIG. 7 illustrates the steps of a process 700 to perform the domain exchange by the registry and is a detailed breakdown of step 535 from FIG. 5. The domain name is replaced in the domain registration records of the registry (step 705). Referring again to FIG. 3, the Registry Domain Record 330 is updated with the new domain name, and the domain record identifier, as found in 330, remains the same. The replacement is recorded for tracking and reporting purposes (step 710). Replacement entries into the registry's DNS for the TLD are generated (step 715). If the domain name utilizes DNS Security protocols (DNSSEC), then new DNSSEC information is received and also incorporated into replacement entries into the registry's DNS for the TLD, including the Delegation Signer (DS) Resource Record associated with DNSSEC. The changes are pushed to the DNS servers operated by the registry for the TLD associated with the domain name (step 720). Finally, the existing domain name is processed to make available to future registrants (step 725). For example, the domain name could be released into the pool of available domain names for immediate registration, the domain name could be released into the pool of available domain names according to a schedule, or the domain name could be held for a time period before being released for open-registration while being made available for registration in an auction-type setting.

In one embodiment, the records of the domain name exchange that are recorded in 710 can be accessed by a user through a search function in which the registry receives a search request based either on the domain record identifier or on one of the domain names in the exchange history of the domain record identifier. The registry, in response to the request, sends information regarding the domain name history associated with the domain record identifier or domain name.

It will be apparent to those skilled in the art that many of the preceding steps can be performed in a different order to achieve the same end result, and therefore none of the preceding steps should be construed to be required to be performed in the order as presented.

Setting Registry Service Status

Domain names are assigned, released, and managed using the Extensible Provisioning Protocol (EPP). The EPP is a flexible protocol designed for allocating objects within registries over the Internet. Other objects currently provisioned using EPP are host names and contact information. The motivation for the creation of EPP was to provide a flexible communication protocol between registrars and registries. Although EPP is widely adopted by many registries, the term "provisioned objects," as that term is used herein, should be understood to include the provisioned objects as described in the standards that define EPP. Examples of standard "provisioning objects" include domain names in RFC 5731, host names in RFC 5732, and contacts in in RFC 5733. A "provisioning object" includes the standard EPP objects as existing or yet-to-be-developed objects following the EPP standard.

Domain names, as provisioned objects, have status codes associated with them. Status codes are designations that can be assigned and removed by the registry to define what operations are allowed for a domain name by the registrar and to define whether a domain name should resolve in DNS. Status codes may also provide security for a domain name to prevent, for example, the domain name from being accidently transferred or deleted. The available status codes that can be returned by the EPP system for domain name provisioning are defined as "status values" in the standards described in RFC5731 and RFC5732, respectively (collectively, "the standards"). Some of these status codes are shown in FIG. 8 at 810.

However, for internal use, some registries may implement status codes in addition to those specified in the standards. For example, a registry could apply a status code called "AccountDecredited" to a domain name, serviced by a registrar, that is in arrears. The status code "AccountDecredited" would be returned whenever the registry itself checks the status of that domain name. However, to remain compliant with the standards as mentioned above (or future standards of a similar nature), the registry may respond to an EPP status query for a domain name from an outside entity, such as from a registrar, by returning a status code of similar or related meaning, which is specified in the applicable standard.

Although most status codes defined in the standards can be applied only by the registry, some status codes can be applied by a registrar. For example, the server status codes listed in 810 that have counterparts prefixed with "client" instead of "server" may be applied by the registrar (or even by a registrant through an interface provided by the registrar). Therefore, the embodiments described herein may be adapted for use by registrars, registrants, or any entity needing to establish status management capabilities consistent with the claims.

In one embodiment, a tool is provided to help registries manage server status codes. This tool can also be adapted for use by registrars to manage client status codes. This tool can be further adapted by other entities performing similar management techniques on other provisioned objects.

In one embodiment, the server status codes 810 can be logically grouped into functional status sets 820. For example, the "Court Order Hold" status set 825 includes the status codes serverUpdateProhibited 811, sewerDeleteProhibited 812, serverTransferProhibited 813, serverHold 815, and account suspended 816. For another example, the "Server Renew Prohibited" status set 840 includes the status code serverRenewProhibited 814. In one embodiment, server status sets may also be grouped in logical opposite pairs, such as with "Registry Lock" 830 and "Registry Unlock", "Transfer Dispute Lock" 835 and "Transfer Dispute Lock", and the like. These status sets, as pairs, may be defined as mutually exclusive, such that one is prohibited from assignment to a domain name while the other is also assigned 920.

Figure 9:
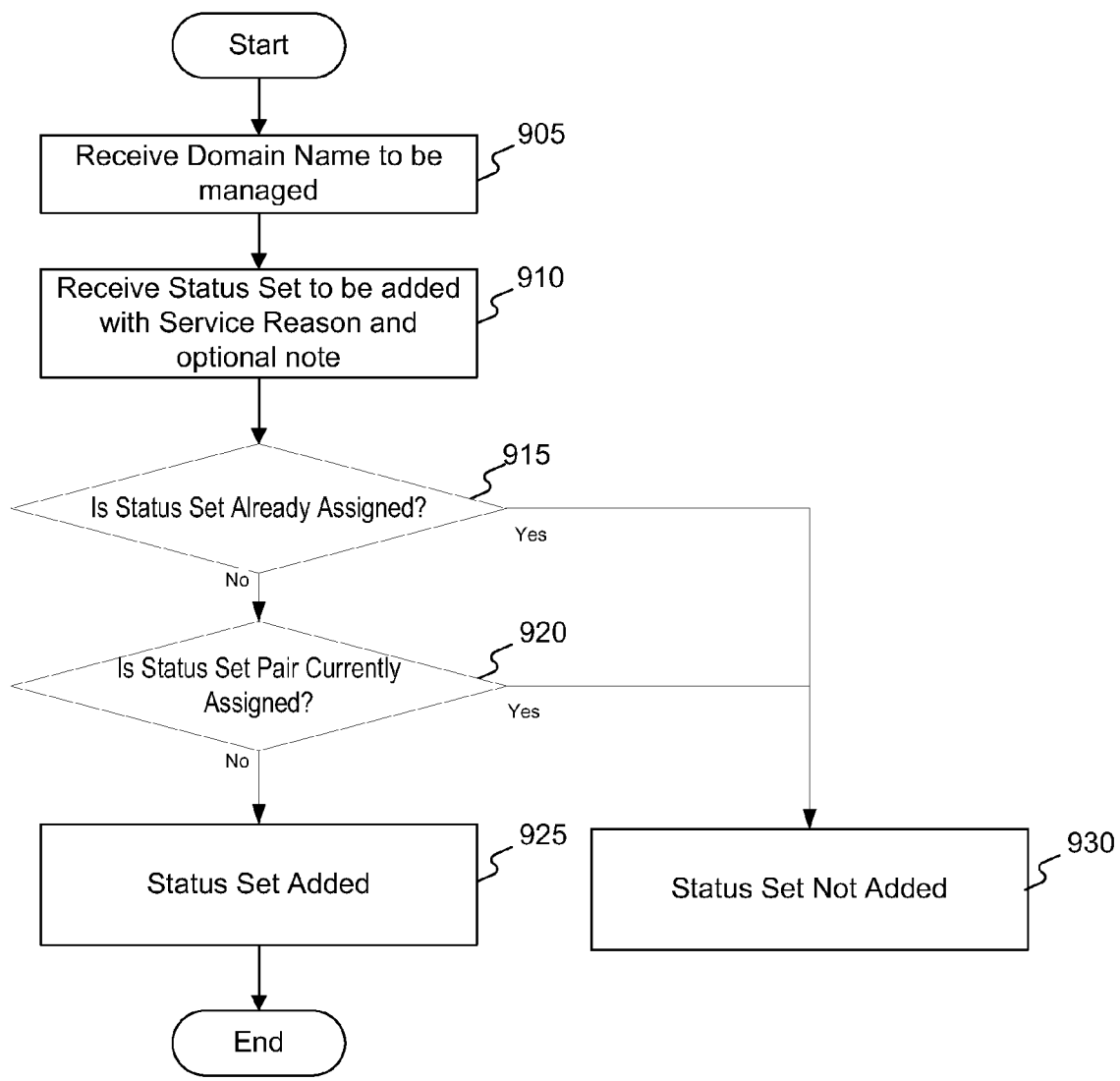
FIG. 9 is an illustration of a process to add a Status Set to a domain.

FIG. 9 illustrates an exemplary process 900 for assigning a status set to a domain name. This process can be adapted to also apply to a host name or other provisioned object. A domain name is entered for which the status set will be assigned (step 905). The status set is added to a database along with a service reason number, and a note with further detailed information may optionally be entered (step 910). In the case of the "Court Order Hold" status set 825, for example, the jurisdiction and related case information of the court issuing the "Hold Order" may be recorded, along with information specifying the length of time during which the "Hold Order" is effective.

In one embodiment, upon attempting to add the status set, the system determines that the status set has not already been added (step 915) and, if so, will not add the status set (step 930). The system also determines whether a status set pair corresponding to the currently added status set has already been added (step 920), such as discussed above with respect to mutually exclusive status sets. If one part of a status set pair is already active, then the status set will not be added (steps 920 & 930); otherwise the status set will be added (step 925).

Figure 10:
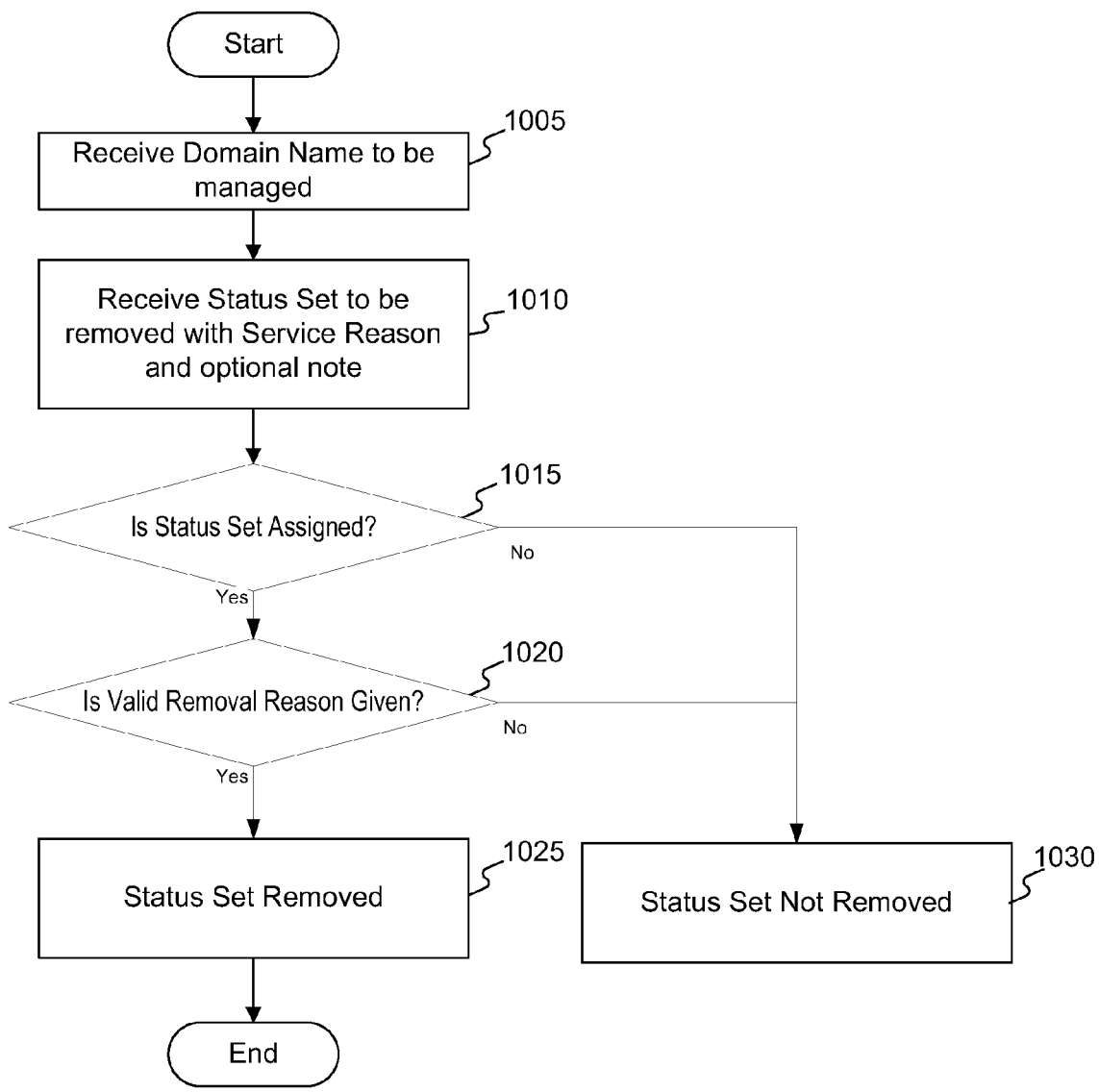
FIG. 10 is an illustration of a process to remove a Status Set from a domain.

FIG. 10 illustrates an exemplary process 1000 for removing a status set from a domain name. This process can be adapted to also apply to a host name or other provisioned object. A domain name is entered specifying the domain name for which the status set will be removed (step 1005). The status set to be removed is also specified, along with a service reason number (step 1010). The operator may also enter a note containing specific information surrounding the removal request. In one embodiment, the system checks that the specified status set is actually assigned (step 1015), and, if not, the status set is not removed (step 1030). Otherwise, the system determines whether a valid removal reason was supplied by the operator (step 1020). If so, the status set is not removed (step 1025). If not, the status set is removed (step 1030).

In one embodiment, the processes of 900 and 1000 can be adapted to accommodate activating and deactivating an assigned status set, rather than adding and removing the status set. For example, the "Registry Lock" 830 might normally be assigned to a domain name. However, if the registrar through which the domain name was registered were to go out of business, the domain name may need to be transferred to another registrar. Temporarily setting the "Registry Lock" to inactive, for the purposes of the transfer, would preserve the settings and notes as originally applied, yet still allow the transfer.

Figure 11:
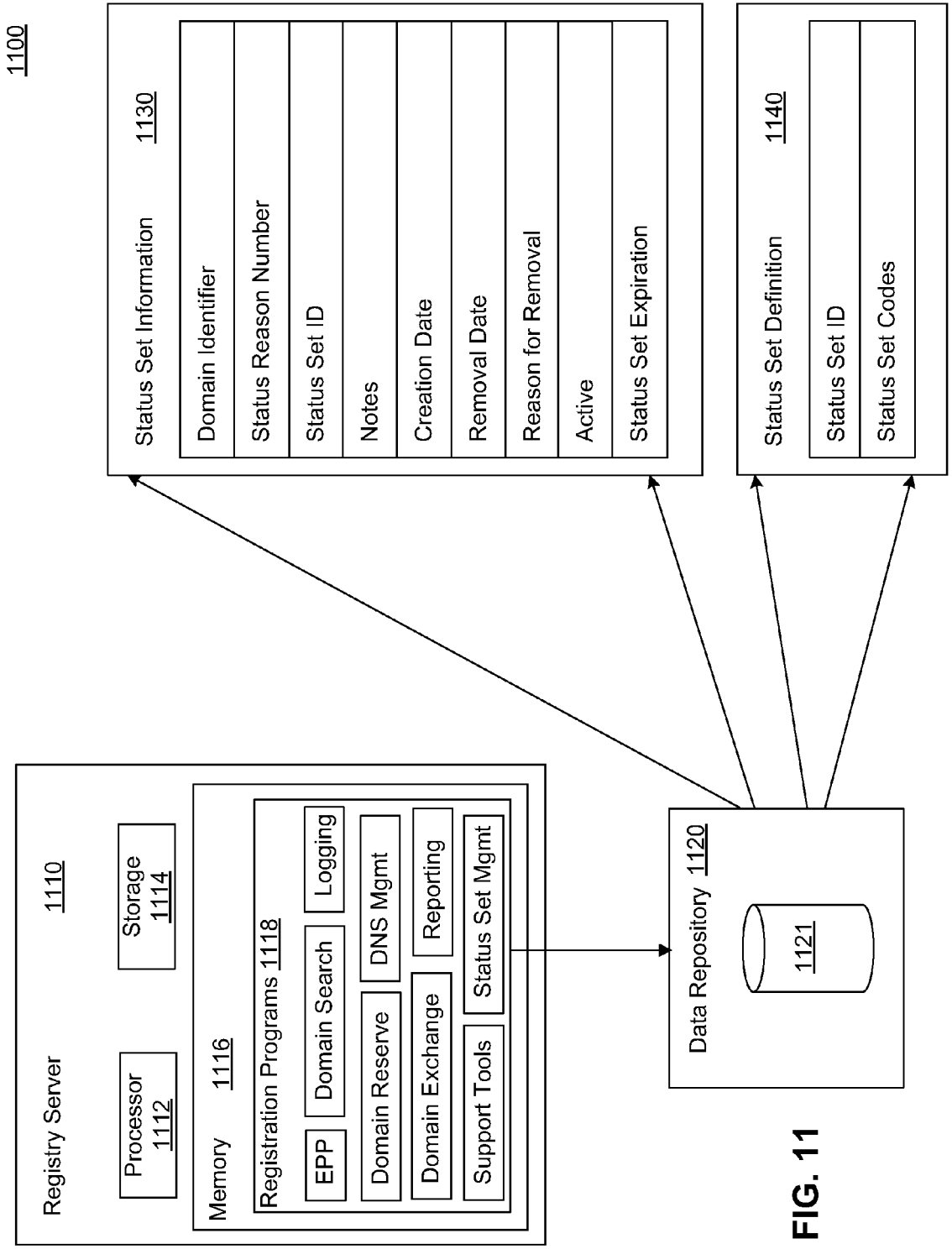
FIG. 11 is an illustration of a Registry Server with supporting Registration programs, including an exemplary registry status set record.

FIG. 11 illustrates for one embodiment, some of the possible data fields, such as status set information 1130 and status set definition 1140, associated with the implementation of a status set as applied to a domain name. FIG. 11 also illustrates exemplary components 1100 of the registry. The components 1100 can include a registry server 1110 having at least one processor 1112, storage 1114, and memory 1116 that can store supporting registration programs 1118 of the registry server 1110. The registry server 1110 can be communicatively coupled to a data repository 1120, which can include a database 1121 that stores at least one status set information 1130 and status set definition 1140.

Figure 12:
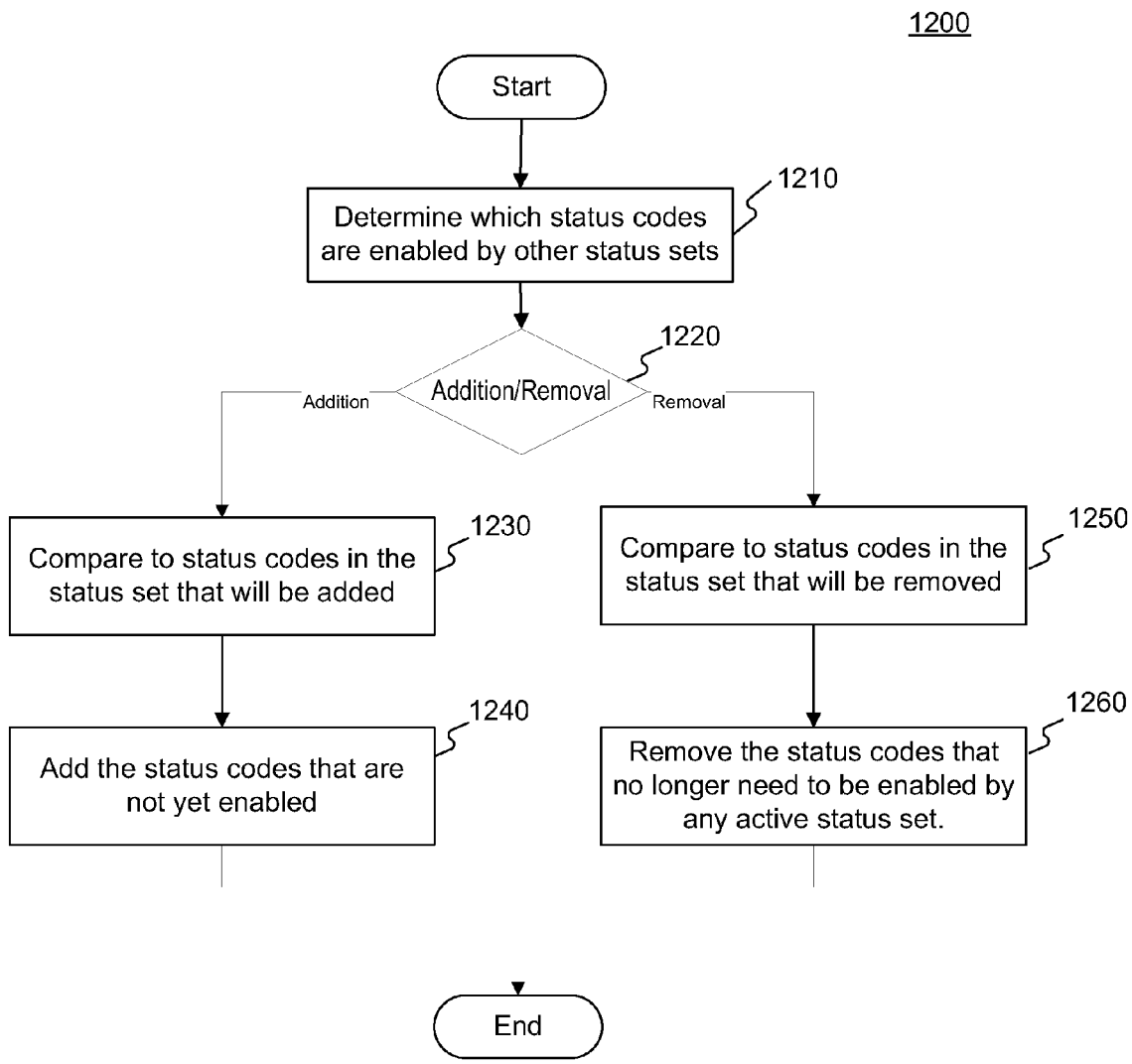
FIG. 12 is an illustration of a process that manages the status codes when a status set is added or removed.

FIG. 12 illustrates an exemplary process 1200 by which status codes may be managed when a status set is added or removed. When a status set is added to a domain, the process 1200 can determine determines which status codes are already enabled (step 1210) and, subsequent to determining that a status set is being added in step 1220, the process can determine which status codes still need to be enabled (step 1230). The process then specifies only the status codes that need to be enabled (step 1240). Likewise, when the process 1200 determines in step 1220 that a status set is being removed, the process 1200 can determine which status codes should be retained (step 1250) (perhaps because they are part of another active status set) and only removes the status codes that may safely be removed (step 1260).

In one embodiment, a custom status set may be added to the available status sets comprising any combination of available status codes. The status codes may consist of designations specified by the entity implementing them. For example, the entity may want to use the status set functionality to add and remove other account locking features. For example, if a web hosting provider's customer was delinquent in paying a bill, a status set managed by the web hosting provider could be added that controls a suspension of web hosting services, a client status lock on the domain (applied through the registrar), and automatic email generation regarding the state of the customer's account.

In one embodiment, a status set may specify a self-expiration time after which the status set would automatically be removed, or would automatically be changed from active to inactive or vice versa.

In one embodiment, the method, as it is applied to "provisioning objects," can also be applied to other resources or objects that have permission characteristics associated with rules. For instance, one embodiment may provide a method of selectively applying the most restrictive of a plurality of rules. A data structure may be provided that includes indicators of permissible or prohibited operations. The data structure represents a logical grouping of such permissible or prohibited operations. The method performs logical operations among a group of one or more data structures to form a resulting set of operational limitations based on the indicators associated with the data structures. The method applies the operational limitations to operations capabilities or permission characteristics associated with a resource or object in accordance with the group of one or more data structures that are associated with the resource or object. Such logical operations include the redefining of the permission characteristics or operations capabilities of the object or resource as data structures are added, removed, suspended, or reinstated. Thus, records of all current permission characteristics or operations capabilities associated with a resource or object are maintained through data structures that group indicators of permissible or prohibited operations, as well as the proper realized permission characteristics and operational capabilities as defined by the most restrictive set of rules defined by the data structures associated with the object or resource.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of processing a domain name exchange, comprising:
    selecting a domain record associated with an existing domain name registration, wherein a first domain name is stored in the domain record as a domain name attribute of the existing domain name registration;
    receiving, by a computer, a second domain name;
    exchanging, by the computer, the first domain name for the second domain name in a domain name exchange, wherein the exchanging includes replacing the first domain name in the domain record with the second domain name as the domain name attribute of the existing domain name registration;
    recording the domain name exchange in a domain name exchange history, wherein the domain name exchange history indicates that the second domain name replaces the first domain name as the domain name attribute of the existing domain name registration;
    updating, by the computer, a domain name server with the second domain name;
    processing, by the computer after the first domain name is replaced with the second domain name, the first domain name to make the first domain name available for registration by a new registrant; and
    providing information indicating a history of the domain name exchange in response to a user request.

2. The method of claim 1, wherein exchanging comprises exchanging the first domain name in accordance with a business rule that specifies at least one of the following: a frequency of exchanges, a number of total exchanges, an expiration of a domain name exchange service indicator, or a domain name exchange in response to an exchange request.

3. The method of claim 1, wherein the domain record is associated with a domain record identifier separate from the first domain name prior to the exchanging, and wherein the domain record remains associated with the domain record identifier subsequent to the exchanging.

4. The method of claim 1, comprising:
    after the step of receiving the second domain name:
        determining whether the second domain name is available; and
        determining whether the first domain name may be changed.

5. The method of claim 1, wherein the updating further comprises updating Domain Name System Security protocols (DNSSEC) information in the domain name server.

6. The method of claim 1, wherein the request includes a domain record identifier associated with the existing domain name registration, the method further comprising:
    providing the information indicating the history of the domain name exchange.

7. The method of claim 1, wherein the first domain name and the second domain name are host names.

8. A system of processing a domain name exchange, comprising:
    a non-transitory memory storing instructions; and
    a processor executing the instructions to cause the system to perform a method comprising:
        selecting a domain record associated with an existing domain name registration, wherein a first domain name is stored in the domain record as a domain name attribute of the existing domain name registration;
        receiving a second domain name;
        exchanging the first domain name for the second domain name in a domain name exchange, wherein the exchanging includes replacing the first domain name in the domain record with the second domain name as the domain name attribute of the existing domain name registration;
        recording the domain name exchange in a domain name exchange history, wherein the domain name exchange history indicates that the second domain name replaces the first domain name as the domain name attribute of the existing domain name registration;
        updating a domain name server with the second domain name;
        after the first domain name is re laced with the second domain name, processing the first domain name to make the first domain name available for registration by a new registrant; and
        providing information indicating a history of the domain name exchange in response to a user request.

9. The system of claim 8 wherein exchanging comprises exchanging in accordance with a business rule that specifies at least one of the following: a frequency of exchanges, a number of total exchanges, an expiration of a domain exchange service indicator, or a domain name exchange in response to an exchange request.

10. The system of claim 8, wherein the domain record is associated with a domain record identifier separate from the first domain name prior to the exchanging, and wherein the domain record remains associated with the domain record identifier subsequent to the exchanging.

11. The system of claim 8, comprising:
after receiving the second domain name:
determining whether the second domain name is available; and
determining whether the first domain name may be changed.

12. The system of claim 8, wherein the updating further comprises updating Domain Name System Security protocols (DNSSEC) information in the domain name server.

13. The system of claim 8, wherein the request includes a domain record identifier associated with the existing domain name registration, and the method further comprises:
providing the information indicating the history of the domain name exchange.

14. The system of claim 8, wherein the first domain name and the second domain name are host names.

15. A non-transitory computer-readable storage medium containing instructions which, when executed on a processor, perform a method comprising:
selecting a domain record associated with an existing domain name registration, wherein a first domain name is stored in the domain record as a domain name attribute of the existing domain name registration;
receiving a second domain name;
exchanging the first domain name for the second domain name in a domain name exchange, wherein the exchanging includes replacing the first domain name in the domain record with the second domain name as the domain name attribute of the existing domain name registration;
recording the domain name exchange in a domain name exchange history, wherein the domain name exchange history indicates that the second domain name replaces the first domain name as the domain name attribute of the existing domain name registration;
updating a domain name server with the second domain name;
after the first domain name is re aced with the second domain name, processing the first domain name to make the first domain name available for registration by a new registrant; and
providing information indicating a history of the domain name exchange in response to a user request.

16. The non-transitory computer-readable storage medium of claim 15, wherein exchanging further comprises exchanging in accordance with a business rule that specifies at least one of the following: a frequency of exchanges, a number of total exchanges, an expiration of a domain exchange service indicator, or a domain name exchange in response to an exchange request.

17. The non-transitory computer-readable storage medium of claim 15, wherein the domain record is associated with a domain record identifier separate from the first domain name prior to the exchanging, and
wherein the domain record remains associated with the domain record identifier subsequent to the exchanging.

18. The non-transitory computer-readable storage medium of claim 15, wherein the method further comprises:
after the step of receiving the second domain name:
determining whether the second domain name is available; and
determining whether the first domain name may be changed.

19. The non-transitory computer-readable storage medium of claim 15, wherein updating further comprises updating Domain Name System Security protocols (DNSSEC) information in the domain name server.

20. The non-transitory computer-readable storage medium of claim 15, wherein the request includes a domain record identifier associated with the existing domain name registration, and the method further comprises:
providing the information indicating the history of the domain name exchange.

21. The non-transitory computer-readable storage medium of claim 15,
wherein the first domain name and the second domain name are host names.

* * * * *